United States Patent
Yoo et al.

(10) Patent No.: US 6,877,079 B2
(45) Date of Patent: Apr. 5, 2005

(54) MEMORY SYSTEM HAVING POINT-TO-POINT BUS CONFIGURATION

(75) Inventors: Chang-sik Yoo, Suwon (KR); Kye-hyun Kyung, Suwon (KR)

(73) Assignee: Samsung Electronics Co., Ltd. (KR)

( * ) Notice: Subject to any disclaimer, the term of this patent is extended or adjusted under 35 U.S.C. 154(b) by 166 days.

(21) Appl. No.: 10/079,097

(22) Filed: Feb. 20, 2002

(65) Prior Publication Data

US 2002/0129215 A1 Sep. 12, 2002

Related U.S. Application Data

(60) Provisional application No. 60/273,890, filed on Mar. 6, 2001.

(51) Int. Cl.[7] ............................................. G06F 12/00
(52) U.S. Cl. .................................... 711/167; 711/105
(58) Field of Search ............................... 711/104, 105, 711/167, 5, 115

(56) References Cited

U.S. PATENT DOCUMENTS

| | | | | |
|---|---|---|---|---|
| 5,586,299 A | * | 12/1996 | Wakerly ...................... | 711/149 |
| 5,742,840 A | * | 4/1998 | Hansen et al. .............. | 712/210 |
| 5,822,603 A | | 10/1998 | Hansen et al. ................. | 712/1 |
| 5,987,576 A | * | 11/1999 | Johnson et al. ............. | 711/167 |
| 6,065,077 A | | 5/2000 | Fu .............................. | 710/100 |
| 6,144,576 A | | 11/2000 | Leddige et al. ............... | 365/63 |
| 6,247,070 B1 | * | 6/2001 | Ryan ............................ | 710/13 |
| 6,408,356 B1 | * | 6/2002 | Dell ............................ | 711/105 |
| 6,442,644 B1 | * | 8/2002 | Gustavson et al. .......... | 711/105 |
| 6,477,614 B1 | * | 11/2002 | Leddige et al. ................ | 711/5 |
| 6,530,006 B1 | * | 3/2003 | Dodd et al. .................. | 711/167 |
| 6,625,687 B1 | * | 9/2003 | Halbert et al. .............. | 711/105 |
| 2003/0007379 A1 | * | 1/2003 | Osaka et al. ................. | 365/52 |

FOREIGN PATENT DOCUMENTS

| | | | | |
|---|---|---|---|---|
| JP | 5173991 | 7/1993 | ........... | G06F/15/16 |
| JP | 07129291 | 5/1995 | ............. | G06F/3/00 |
| JP | 09212267 | 8/1997 | ............. | G06F/3/00 |
| JP | 2001051896 | 2/2001 | ........... | G06F/12/06 |

* cited by examiner

*Primary Examiner*—Matthew Anderson
*Assistant Examiner*—Shane Thomas
(74) *Attorney, Agent, or Firm*—Mills & Onello LLP

(57) ABSTRACT

A clocking system and method in a point-to-point bus configuration overcomes the limitations of conventional approaches. In one embodiment, the present invention ensures the same phase relationship for the write clock in the write direction for all data transfers between modules, and similarly the same phase relationship for the read clock in the read direction for all data transfers between modules, regardless of module location. In another embodiment, on a given module, all transfers of data between a data buffer and a memory device in both read and write directions are clocked by a read clock signal and a write clock signal that have the same phase relationship and have the same propagation delay as the data bus between the buffer and the memory device.

39 Claims, 9 Drawing Sheets

MEMORY SYSTEM HAVING POINT-TO-POINT BUS CONFIGURATION

RELATED APPLICATIONS

This application claims the benefit of U.S. Provisional Patent Application Ser. No. 60/273,890, filed Mar. 6, 2001.

BACKGROUND OF THE INVENTION

Memory systems are often times arranged in a stub architecture. In such an architecture, memory modules are arranged in parallel as stubs along a common data bus, control/address bus, and clock bus. In order to increase data transmission rates in a memory system having a stub bus architecture, careful control over signal integrity is necessary; signal integrity in turn being affected by the stub load. A stub load behaves on a transmission line as a discontinuous point, which results in signal reflection. Signal reflection due to the stub load deteriorates signal integrity, thereby limiting the overall data transmission rate of the system.

Attempts have been made to suppress the detrimental affect of a stub load by configuring the stub bus according to a stub-series-terminated-logic (SSTL) architecture. However this configuration has a fundamental limit in increasing the data transmission rate because, although the adverse effects of the stub load are mitigated, the load is still included in the configuration.

To overcome the limitations encountered by the stub bus architecture, a short-loop-through (SLT) structure has been proposed. In the SLT bus structure, system components are arranged in series on a signal line. In the case of a memory module, for example, the signal line extends along the motherboard through a module connector to a first side of the module and on to a desired component on the module. The signal line then passes through the module body to a second component on a second face of the module and returns to the motherboard through a second coupling on the module connector. From the first module connector, the signal line extends on the motherboard to a second module connector, to the second module, and so on. Therefore, in the SLT bus structure, there are no discontinuous points due to stub loads, such that signal integrity is enhanced and data transmission rate can therefore be increased. However since two pins are required for each signal, the resulting number of module pins is double the number required by the stub bus structure, which increases system costs. Moreover, the loading of a signal line increases as the number of modules increases, which limits the maximum operable data transmission rate.

To address the limitations encountered in the SLT bus structure, a point-to-point bus structure has been proposed. For example, U.S. Pat. No. 5,742,840, to Hansen, et al. proposes such a structure in FIG. 13. In the point-to-point bus structure, only a single load is driven by a single source, and a discontinuous point such as a stub, does not exist. In this manner, the data transmission rate can be considerably increased. As data is passed from module to module, a complicated clocking scheme is required, as each data transfer between modules may have its own phase relationship and therefore the phase relationship of the clock signals in the read direction and write direction may be different, depending on module position.

SUMMARY OF THE INVENTION

The present invention is directed to a clocking system and method in a point-to-point bus structure that overcomes the limitations of the conventional approaches. In one embodiment, the present invention ensures the same phase relationship for the write clock in the write direction for all data transfers between modules, and similarly the same phase relationship for the read clock in the read direction for all data transfers between modules, regardless of module location. In another embodiment, on a given module, all transfers of data between a data buffer and a memory device in both read and write directions are clocked by a read clock signal and a write clock signal that have the same phase relationship and have the same propagation delay as the data bus between the buffer and the memory device.

In one aspect the present invention is directed to a memory module for use in a memory system having a point-to-point bus configuration. the memory module includes a memory device and a buffer, the buffer receiving a first write clock signal and a control signal that includes a read or write command in a first direction of transmission, the buffer receiving a first read clock signal in a second direction of transmission, the buffer being coupled to a first bidirectional data bus and a second bidirectional data bus. The memory module generates a second write clock signal in response to the first write clock signal for transmitting data from the buffer in the first direction of transmission if the write command indicates that data is to be written to another memory module in the system, and further generates a memory write clock signal in response to the first write clock signal for writing data from the buffer to the memory if the write command indicates that data is to be written to the memory in the module. The memory module further generates a memory read clock signal in response to the first write clock signal for reading data from the memory to the buffer if the read command indicates that data is to be read from the memory in the module.

The memory module may further generate a second read clock signal in response to the first write clock signal for transmitting data from the buffer in the second direction of transmission if the read command indicates that data is to be read from another memory module in the system.

The memory read clock signal preferably comprises a returned signal of the memory write clock signal, in which case, the memory read clock signal is generated on a transmission path that is coupled to a transmission path of the memory write clock signal. A dummy load may be coupled to the transmission path of the memory read clock signal and the memory write clock signal. The transmission path length of the memory read clock signal and the transmission path length of the memory write clock signal are preferably equal to the transmission path length of the data signals between the memory and the buffer.

The second write clock signal, the second read clock signal, the memory write clock signal, and the memory read clock signal are preferably generated in response to the first write clock signal such that the generated signals are in phase with the first write clock signal, for example by a phase locked loop or delay locked loop.

In another aspect, the present invention is directed to a memory module for use in a memory system having a point-to-point bus configuration. The memory module includes a memory device and a buffer, the buffer receiving a first write clock signal and a control signal that includes a read or write command in a first direction of transmission, the buffer receiving a first read clock signal in a second direction of transmission, the buffer being coupled to a first bidirectional data bus and a second bidirectional data bus.

The memory module generates a second write clock signal in response to the first write clock signal for transmitting data from the buffer in the first direction of transmission if the write command indicates that data is to be written to another memory module in the system.

The memory module generates a memory write clock signal in response to the first write clock signal for writing data from the buffer to the memory if the write command indicates that data is to be written to the memory in the module.

The memory module generates a memory read clock signal in response to the first write clock signal for reading data from the memory to the buffer if the read command indicates that data is to be read from the memory in the module.

The memory module generates a second read clock signal in response to the first write clock signal for transmitting data from the buffer in the second direction of transmission if the read command indicates that data is to be read from another memory module in the system.

In another aspect, the present invention is directed to a memory system having a point-to-point bus configuration. The system includes a memory controller for generating a first write clock signal and a control signal that includes a read or write command; and a memory module including a memory device and a buffer, the buffer receiving the first write clock signal and the control signal in a first direction of transmission, the buffer receiving a first read clock signal in a second direction of transmission, the buffer being coupled to a first bidirectional data bus and a second bidirectional data bus. The memory module generates a second write clock signal in response to the first write clock signal for transmitting data from the buffer in the first direction of transmission if the write command indicates that data is to be written to another memory module in the system, and generates a memory write clock signal in response to the first write clock signal for writing data from the buffer to the memory if the write command indicates that data is to be written to the memory in the module. The memory module further generates a memory read clock signal in response to the first write clock signal for reading data from the memory to the buffer if the read command indicates that data is to be read from the memory in the module.

In another aspect, the present invention is directed to a memory system having a point-to-point bus configuration. The system comprises a memory controller for generating a first write clock signal and a control signal that includes a read or write command and a read clock generator for generating a first read clock signal. A memory module includes a memory device and a buffer, the buffer receiving the first write clock signal and the control signal in a first direction of transmission, the buffer receiving the first read clock signal in a second direction of transmission, the buffer being coupled to a first bidirectional data bus and a second bidirectional data bus. The memory module generates a second write clock signal in response to the first write clock signal for transmitting data from the buffer in the first direction of transmission if the write command indicates that data is to be written to another memory module in the system, and generates a memory write clock signal in response to the first write clock signal for writing data from the buffer to the memory if the write command indicates that data is to be written to the memory in the module. The memory module generates a memory read clock signal in response to the first write clock signal for reading data from the memory to the buffer if the read command indicates that data is to be read from the memory in the module; and generates a second read clock signal in response to the first read clock signal for transmitting data from the buffer in the second direction of transmission.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
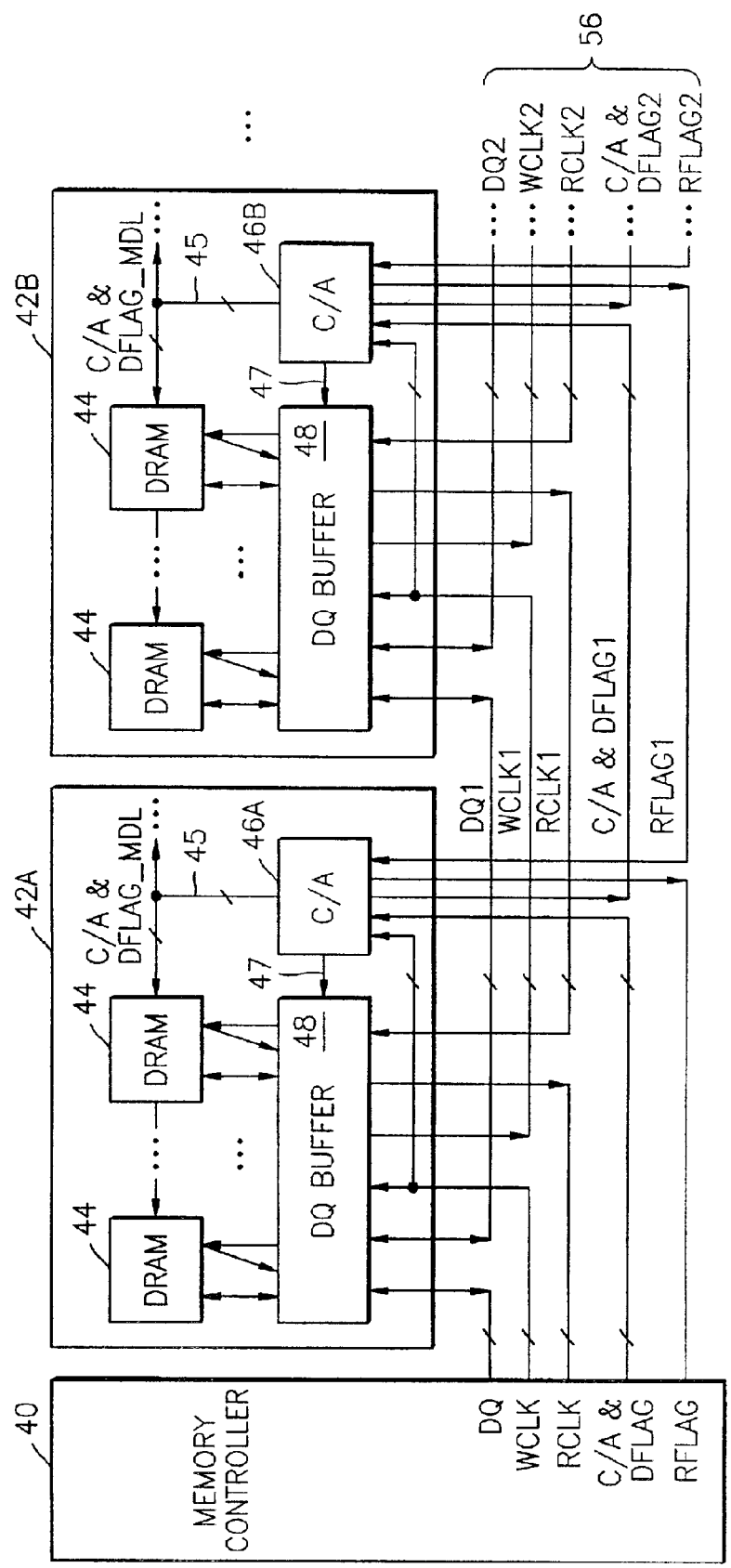
FIG. 1 is a schematic block diagram of a point-to-point memory system in accordance with the present invention.

FIG. 1 is a schematic block diagram of a memory system according to the present invention. The memory system includes a memory controller 40, a plurality of memory modules 42A, 42B. A number of signal lines 56, for example mounted on a motherboard transfer signals between the memory controller 40 and the various modules 42A, 42B.

Each memory module 42A, 42B includes a data buffer 48, a command/address signal buffer 46, and a plurality of memory devices 44. In one example, the memory devices 44 may comprise dynamic random access memory (DRAM) devices. The data buffer 48 manages the buffering of data signals on the data bus DQ, and transfers the data in response to a write clock signal WCLK and a read clock signal RCLK, among others. The command/address buffer 46 manages the buffering of command signals, address signals, and flag signals, and controls the data buffer 48 and the memory devices 44 in accordance with the command, address, and flag signals. During a write operation, the data buffer 48 transfers buffered data to the memory devices 44, while during a read operation, the data buffer 48 receives data from the memory devices 44. While only two memory modules, namely 42A, 42B are shown in the exemplary illustration of FIG. 1, it is understood that additional memory modules can be added to the system in like manner.

In the point-to-point system architecture of the present invention, the data bus DQ is transferred on an independent line from the memory controller 40 to the data buffer 48 of the first memory module 42A. Similarly, the write clock signal WCLK is passed from the memory controller 40 to the data buffer 48 as well as the command/address buffer 46 of the first memory module on an independent line. The read clock RCLK is received by the memory controller 40 from the data buffer 48 of the first memory module 42A on an independent line. Also, the command/address C/A and DFLAG signals are transferred to the command/address buffer 46 of the first memory module from the memory controller 40 on an independent line, and the RFLAG signal is received by the memory controller from the command/address buffer 46 of the first memory module 42A on an independent line.

Signals are similarly transferred between the first memory module 42A and the second memory module 42B on signal lines DQ1, WCLK1, RCLK1, C/A&DFLAG1, and RFLAG1 that are independent of the signal lines for passing signals between the memory controller 40 and the first memory module 42A. Another set of signal lines DQ2, WCLK2, RCLK2, C/A&DFLAG2, and RFLAG2 transfer signals between the second memory module 42b and a third memory module (not shown), and so on. As explained above, in the point-to-point bus structure, only a single load is driven by a single signal source, and therefore the addition of further memory modules does not impart an additional load on the signal lines.

As described above, data are exchanged between the memory controller 40 and the first and second memory modules 42A, 42B on a local, independent data bus DQ. A write clock WCLK is generated by the memory controller 40 and is transmitted to the data buffer 48 and command/address buffer 46 of the first memory module 42A, as a reference for the transfer of data DQ from the memory controller 40 to the first memory first module 42A in synchronization with the rising and falling edges of the write clock WCLK. Similarly, the command/address signals (C/A) are transferred to the first memory module 42A from the memory controller 40 in synchronization with the write clock signal WCLK. In this manner, the write clock signal WCLK, as received by the data buffer 48 is used to sample the data received on the data bus DQ by the data buffer 48, while the same write clock signal WCLK, as received by the command/address buffer 46 is used to sample the command/address signals received on the command/address bus C/A by the command/address buffer 46.

Upon receiving a command/address C/A signal, the command/address buffer 46 of the first memory module buffers the received command/address C/A signal and then transmits the buffered command/address C/A signal to the memory devices 44 of the first memory module 42A, and simultaneously transmits via signal 45 the command/address C/A signal to the command/address buffer 46 of the second memory module 42B. The command/address buffer 46 of each module 42A, 42B functions primarily to transmit the input command/address signal to each memory device 44 hosted on the module 42A, 42B and to the command/address buffer on the adjacent module, and also functions to perform a minimal level of command/address decoding for transmitting a decoding signal 47 that notifies the corresponding data buffer 48 on that module of the input/output direction of the data signals DQ. In other words, the command/address buffer notifies the data buffer 48 as to whether the data signals DQ present in the data buffer 48 are to be transmitted to the memory devices 44 in the local module, or to memory devices 44 in another module in the system, or to the memory controller 40.

In traditional memory systems, it is common for the data bus DQ to operate at a rate that is two times faster than the command/address C/A bus. For this reason, control commands are provided to the memory modules 42A, 42B in advance of the data so that the memory devices on the module have sufficient time to prepare for the data read or data write operation. The latency between the command and data signals is commonly referred to as column address strobe (CAS) latency. With reference to FIG. 1, an optional data flag DFLAG signal, generated by the memory controller 40, provides the CAS latency information for both read and write operations to the memory modules 42A, 42B. The C/A buffer 46A, 46B receives the DFLAG signal from the memory controller 40 and outputs a localized data flag signal to each memory device 44 on the module 42A, 42B via buffered DFLAG_MDL signal 45. Upon sensing a transition in the DFLAG signal, each memory device 44 on the module 42A, 42B outputs read or write data on the data bus DQ following a predetermined time interval. The DFLAG signal is received by the command/address buffer 46 in synchronization with the write clock WCLK signal. The DFLAG signal will experience the same propagation delay as the WCLK in the direction of propagation between the memory controller 40 and the memory modules 42A, 42B.

The C/A buffer 46 may optionally generate a return flag signal RFLAG for the return path in response to the DFLAG signal. The optional RFLAG signal may be needed in cases where there is a phase difference between the read clock RCLK, which is synchronized with the read data DQ, and the DFLAG signal generated by the controller. If it is possible for the memory controller to compensate for the phase difference, the RFLAG signal can be eliminated. The RFLAG signal carries timing information related to when read data DQ output by the memory devices 44 will arrive at the memory controller 40. While the memory controller 40 can receive valid data transferred from the memory module 42A in synchronization with the read clock signal RCLK transferred from the memory module 42A, it is possible for the memory controller to receive invalid data from the memory module 42A, should the time difference between the WCLK and RCLK signals at the controller be greater than one clock cycle. The RFLAG signal ensures that valid data is received by the memory controller 40 at all times, and as such, the memory controller 40 receives the data in response to the read flag signal RFLAG and read clock signal RCLK transferred from the first module 42A.

Accordingly, the memory controller 40 recognizes the read data DQ arrival time via the RFLAG signal output by the C/A buffer 46A. The RFLAG signal preferably has the same propagation delay time as the read data DQ signals as the line on which the RFLAG signal is transported is preferably configured to be routed with, and therefore have the same propagation delay as the read clock RCLK and data bus DQ signals.

Figure 2:
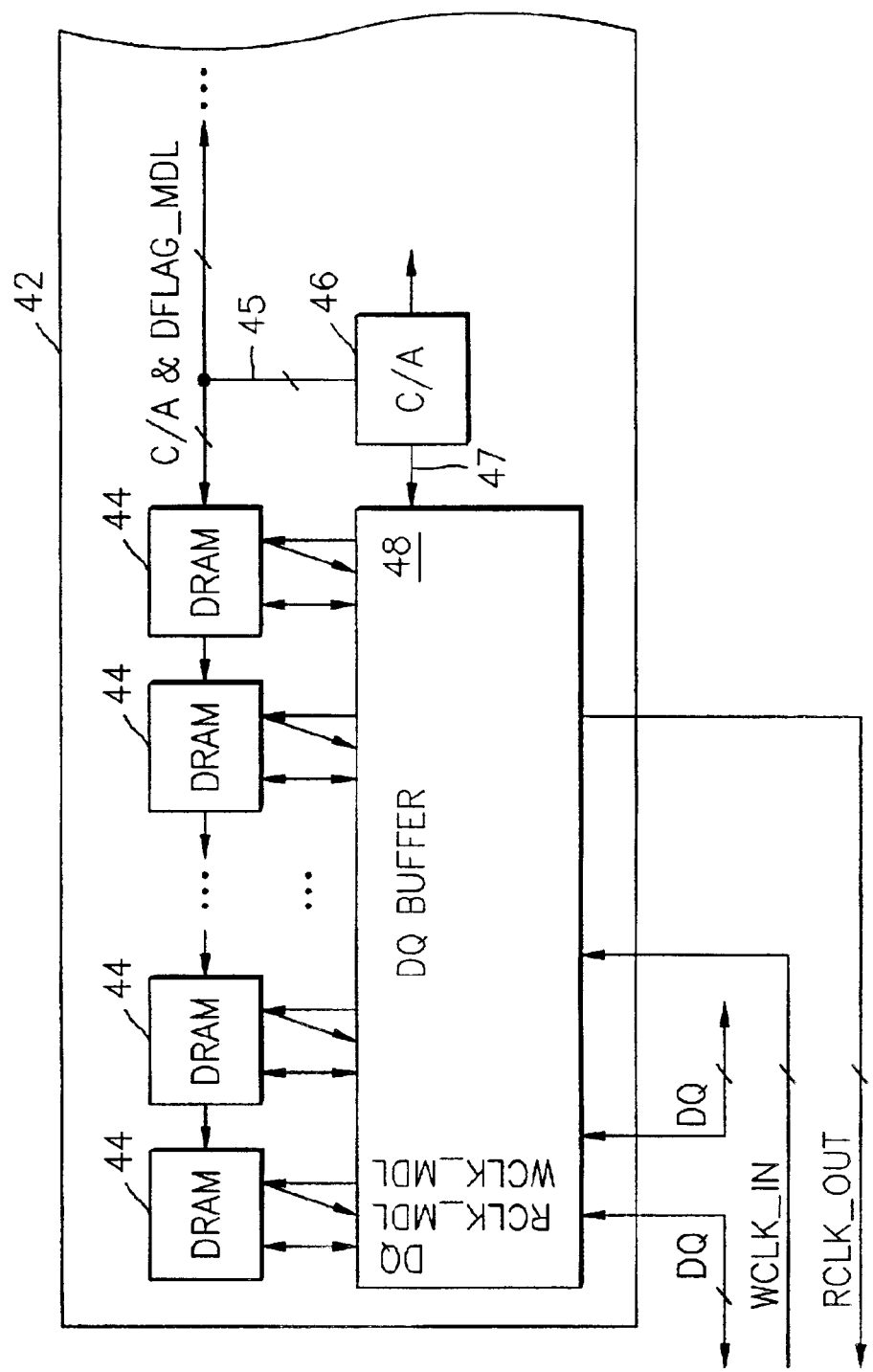
FIG. 2 is a schematic block diagram illustrating clock signals that are passed in conjunction with the data between a data buffer and memory devices of a memory module for the clocking technique according to the present invention.

The data buffer 48 receives or transmits data according to whether a write operation or a read operation is to be performed. In the case of a write operation, the data buffer 48 receives data signals DQ transmitted from the memory controller 40 in synchronization with the write clock signal WCLK output by the controller 40. The data buffer 48 then determines whether to transmit the data signals DQ to the memory devices 44 mounted on the local module on the basis of the control/address decoding signal 47 generated by the control/address buffer 46. With reference to FIG. 2, assuming that data is to be written to a memory device 44 local to the module 42, the data buffer 48 generates a module write clock WCLK_MDL based on the input write clock signal WCLK_IN and transmits the data signals DQ to the memory devices 44 in synchronization with the module write clock signal WCLK_MDL. In a preferred embodiment, the module write clock signal is generated based on the input write clock signal WCLK_IN, such that the two signals are in phase with each other.

In the case of a data read operation, the data buffer 48 receives read data DQ in synchronization with a module read clock signal RCLK_MDL that is generated based on the module write clock signal WCLK_MDL received by the memory devices 44. Next, with reference to FIG. 1 and FIG. 2, the data buffer 48 outputs the buffered read data DQ to the memory controller 40 in synchronization with the read clock signal RCLK_OUT generated by the first module 42A based on the input write clock signal WCLK_IN. Alternatively, in the case of a second module 42B, the data buffer 48 outputs the read data DQ to the data buffer 48 of the adjacent module 42A in synchronization with an output read clock RCLK_OUT signal generated based on the received write clock WCLK_IN signal.

Figure 3:
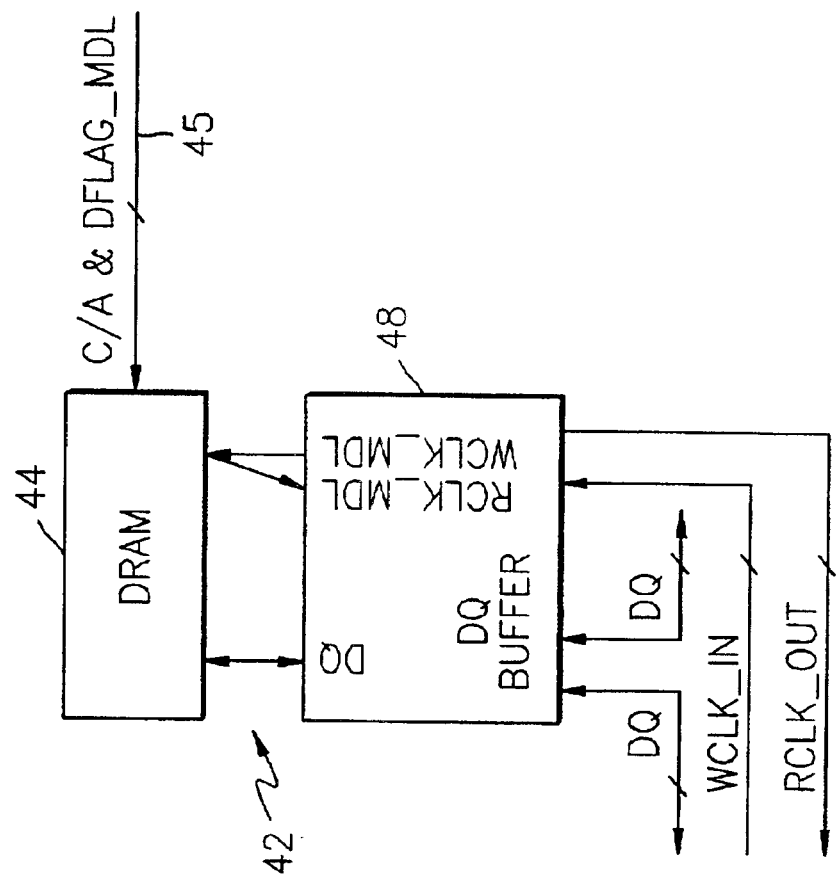
FIG. 3 illustrates the generation of the module read clock RCLK_MDL signal at a memory device, by returning the received module write clock WCLK_MDL signal, for the clocking of data transferred between a data buffer and a memory device in accordance with the present invention.

FIG. 3 is a schematic block diagram illustrating the interaction of the module read clock RCLK_MDL and module write clock WCLK_MDL signals used for transferring data DQ between the data buffer 48 and memory devices 44 of a given memory module 42A, 42B. As explained above, data is written from the data buffer 48 to the memory device 44 in synchronization with the module write clock WCLK_MDL. Similarly, data is read from the memory device 44 to the data buffer 48 in synchronization with the module read clock RCLK_MDL. The module write clock signal WCLK_MDL line and the module read clock signal line RCLK_MDL are preferably routed with the data bus lines DQ on the memory module between the data buffer 48 and the memory device 44 such that the clock signals WCLK_MDL, RCLK_MDL and the data signals DQ experience the same propagation delay. In this manner, the transmitted data and clock signals will arrive simultaneously at the receiving unit, and therefore the received clock signal can be used to clock the data signals with precision.

In a preferred embodiment of the present invention, as shown in FIG. 3, the line on which the module read clock RCLK_MDL is transferred may be coupled at the memory device 44 to the line on which the module write clock WCLK_MDL is transferred. In this manner, the module read clock signal RCLK_MDL is returned to the data buffer 48 in order to sample read data DQ output from each memory device 44. As shown in FIG. 2, in this embodiment, a number of module read clock RCLK_MDL signals are generated by each memory device 44 in response to each module write clock signal WCLK_MDL.

Figure 8:
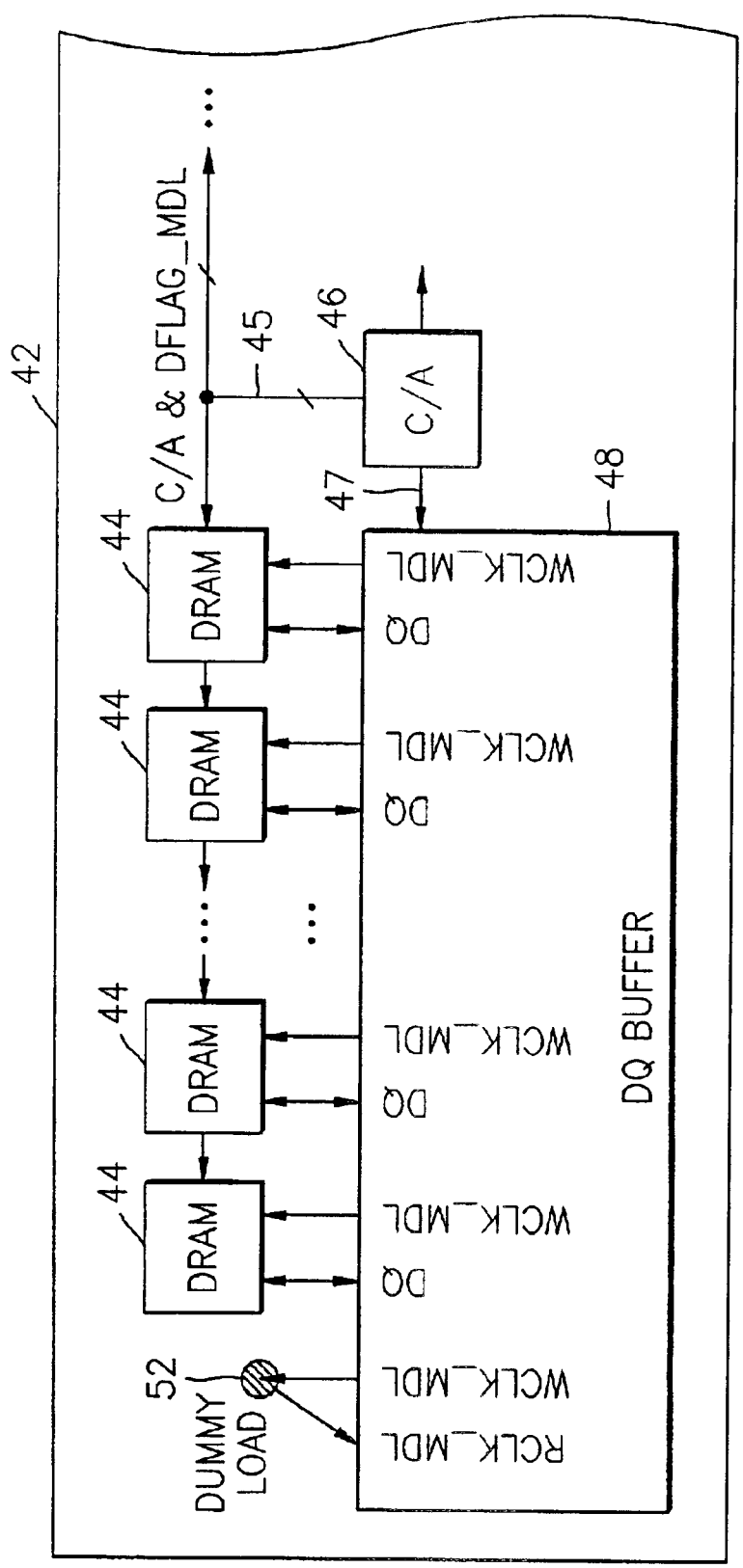
FIG. 8 is a schematic block diagram illustrating generation of the module read clock RCLK_MDL signal by coupling the module write clock WCLK_MDL to a dummy load in accordance with the present invention.

In an alternative embodiment illustrated in FIG. 8, a single module read clock signal RCLK_MDL is returned to the data buffer 48 in response to multiple module write clock signals WCLK_MDL. As shown in FIG. 8, each of the four memory devices 44 receives a corresponding module write clock signal WCLK_MDL. However, a fifth module write clock signal WCLK_MDL is also generated, and tied to a dummy load 52. The length of the line of the module write clock signal WCLK_MDL tied to the dummy load 52 is configured to match that of the module write clock signals WCLK_MDL tied to actual memory devices 44. A module read clock RCLK_MDL line is also tied to the dummy load 52 and returns to the data buffer 48. The length of the line of the module read clock signal RCLK_MDL is configured to match the path length of the data bus DQ between the memory devices 44 and the data buffer 48. The dummy load 52 is preferably configured to have a capacitance that matches that of the clock pin of a memory device 44 receiving the module write clock signal WCLK_MDL. In this manner, the dummy load 52 loads the WCLK_MDL signal as though it were a memory device, while reducing the number of clock pins required by the data buffer 48.

Figure 9:
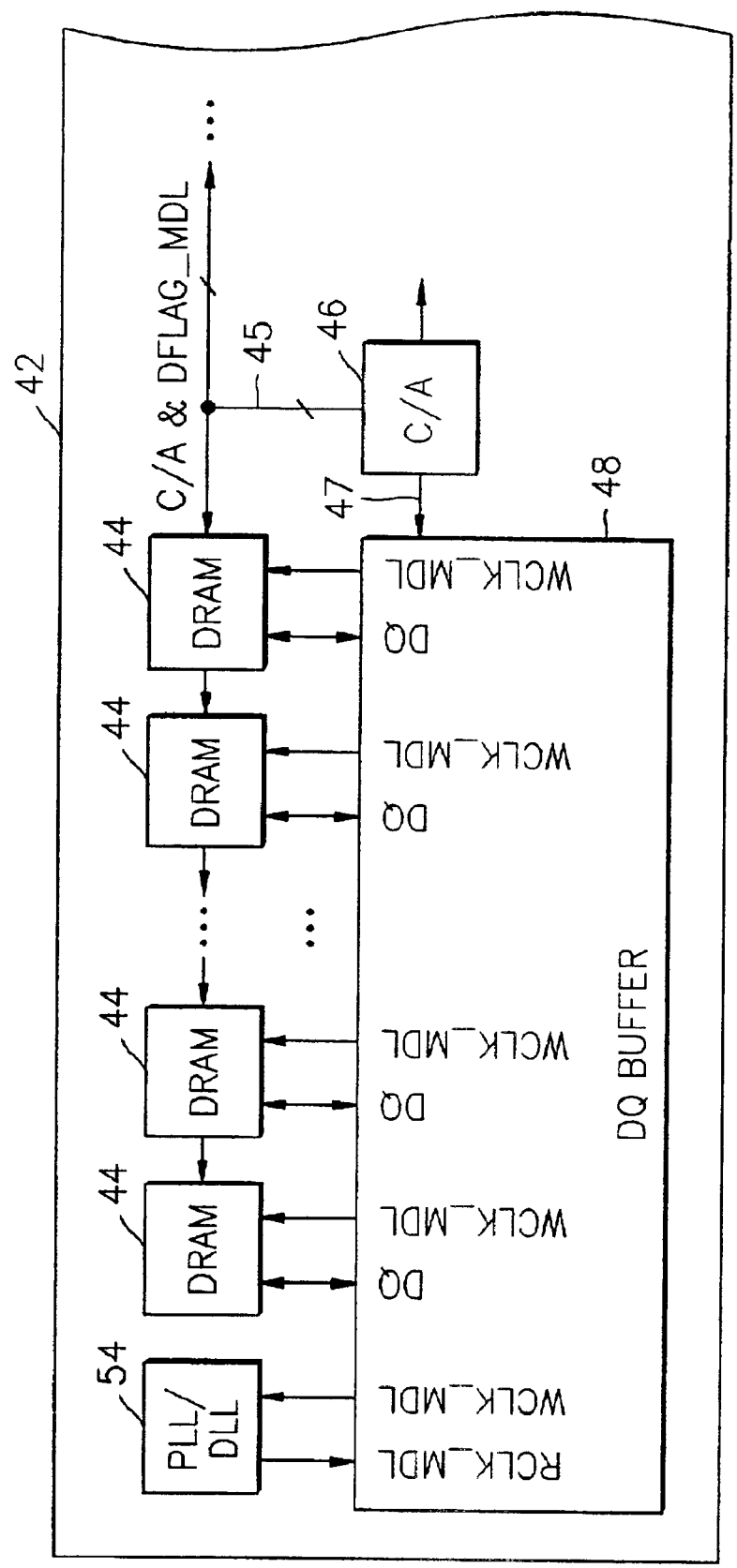
FIG. 9 is a schematic block diagram illustrating generation of the module read clock RCLK_MDL by a phase locked loop or delay locked loop in response to the module write clock WCLK_MDL, in accordance with the present invention.

In a second alternative embodiment illustrated in FIG. 9, a single module read clock signal RCLK_MDL may be generated by a phase locked loop PLL (or delay locked loop DLL) in response to the module write clock signal WCLK_MDL. As shown in FIG. 9, each of the four memory devices 44 receives a corresponding module write clock signal WCLK_MDL. A fifth module write clock signal WCLK_MDL is also generated, and is, in this case, generated by a phase locked loop PLL (or delay locked loop DLL) 54, that returns a module read clock RCLK_MDL signal in response to the received module write clock WCLK_MDL signal. Phase locked loops and delay locked loops are well-known mechanisms for ensuring that an output signal is generated so that the transition edges of the output signal are aligned to those of an input signal; namely, the transition edges of the RCLK_MDL signal are aligned with those of the WCLK_MDL signal. In the case of a phase locked loop (PLL), the phase of a voltage controlled oscillator is controlled until the clock edge of the output RCLK_MDL signal is aligned to that of the input WCLK_MDL signal. In the case of a delay locked loop (DLL) the input signal WCLK_MDL is applied to a variable delay line, the delay of which is controlled until the clock edge of the output signal RCLK_MDL is aligned with that of the input signal WCLK_MDL.

Figure 4:
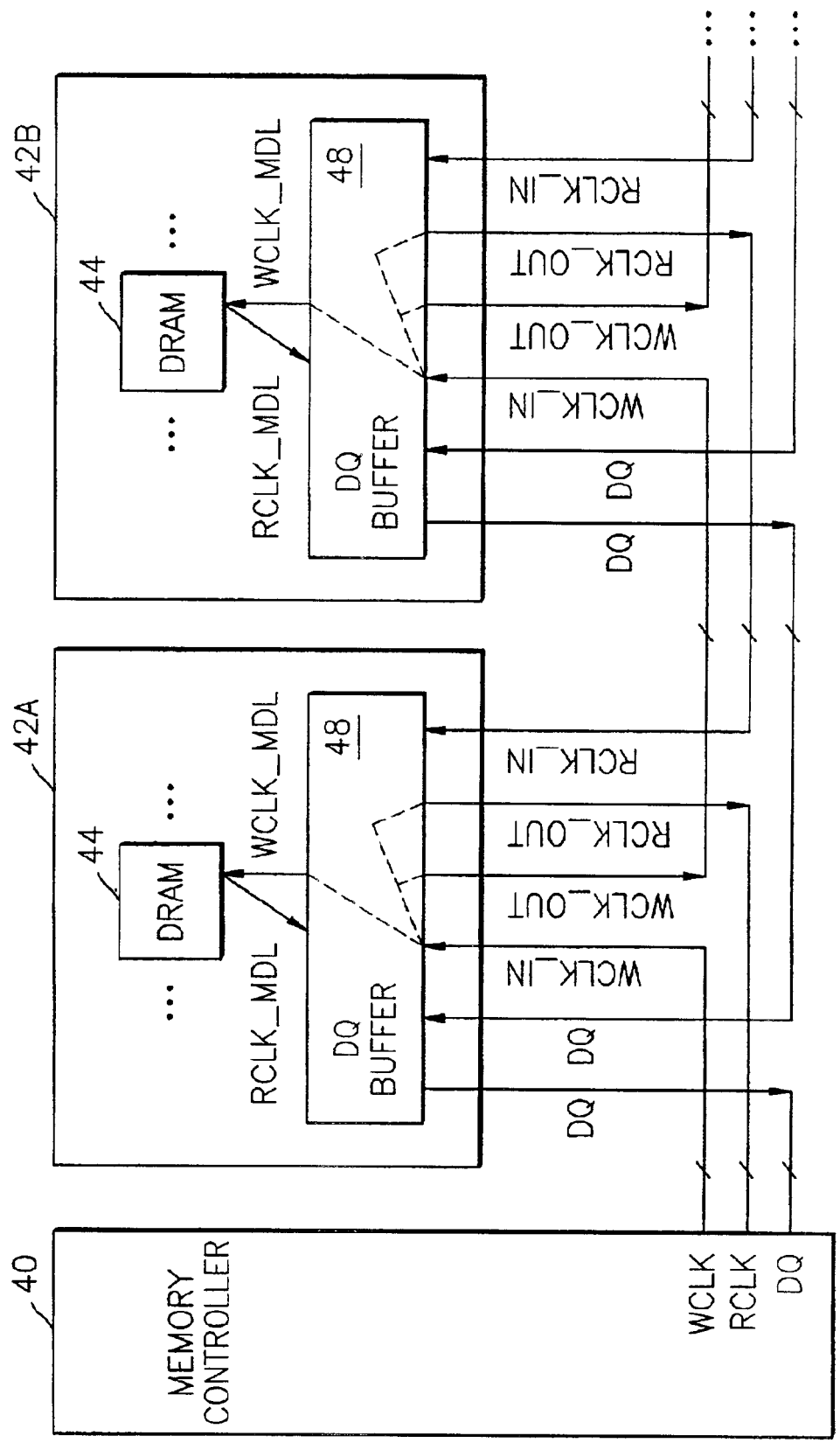
FIG. 4 is a schematic block diagram of a read operation in which the output read clock RCLK_OUT is generated in response to the input write clock WCLK_IN in accordance with the present invention.

FIG. 4 is a schematic block diagram of a read operation in which the output read clock RCLK_OUT is generated in response to, or based on, the input write clock WCLK_IN. In this example, the first module 42A receives a write clock WCLK referred to herein as an input write clock WCLK_IN, for example from a memory controller 40 or adjacent memory module. The memory module 42A in turn generates an output write clock WCLK_OUT that is transferred to the second memory module 42B. The output write clock WCLK_OUT is generated based on the input write clock WCLK_IN and is in phase therewith. As an example embodiment of generating an in-phase output write clock signal WCLK_OUT based on the input write clock signal WCLK_IN, the output write clock WCLK_OUT signal can be generated as the output of a PLL or DLL that receives, as an input, the input write clock signal WCLK_IN.

Similarly, an output read clock RCLK_OUT is generated by the first memory module 42A, in response to the input write clock WCLK_IN signal. The output read clock is transferred to the memory controller 40, or an adjacent memory module for the transfer of data DQ in the read direction. A module write clock signal WCLK_MDL is also generated in response to the received input write clock signal WCLK_IN, as described above, for clocking the internal transfer of data between the data buffer 48 and the memory devices 44. The data buffer 48 of the first memory module 42A further receives an input read clock RCLK_IN that is generated by the second memory module 42B to sample the read data DQ transferred from the second memory module 42B. That is, the data buffer 48 of the first memory module 42A receives the read data DQ transferred from the second memory module 42B in synchronization with the input read clock RCLK_IN generated and output as signal RCLK_OUT by the second memory module 42B.

The output write clock WCLK_OUT of the first memory module 42A is transferred to a second memory module 42B and received as an input write clock WCLK_IN at the second memory module 42B. The second memory module 42B generates an output write clock WCLK_OUT and an output read clock RCLK_OUT in response to the received input write clock WCLK_IN signal, in a manner similar to a first memory module 42A. Similarly, an internal module write clock WCLK_MDL is generated based on the input write clock WCLK_IN signal.

Assuming a read operation as shown in FIG. 4, data is transferred in this example from the second memory module 42B to the first memory module 42A in a right-to-left direction using the input read clock RCLK_IN and output read clock RCLK_OUT for synchronized transfer of the read data DQ. Assuming data is to be read from the second memory module 42B to the first memory module 42A, the data buffer 48 of the second memory module 42B outputs the read data DQ to the data buffer 48 of the first memory module 42A in synchronization with the output read clock RCLK_OUT signal. As described above, in this example, the output read clock RCLK_OUT is generated based on, the input write clock WCLK_IN received by the second memory module 42B. A read operation for transferring data in the read direction from the first memory module 42A to the memory controller 40 operates in similar fashion.

Since, in this example, the output read clock RCLK_OUT signal is generated in response to the input write clock WCLK_IN, the highest order memory module (in this case, the second memory module 42B) does not require an input read clock RCLK_IN signal. Therefore, there is no need for a separate source for the read clock signals RCLK in this embodiment. All write clock WCLK and read clock RCLK signals are generated based on the write clock signal WCLK generated at the memory controller 40.

Figure 5:
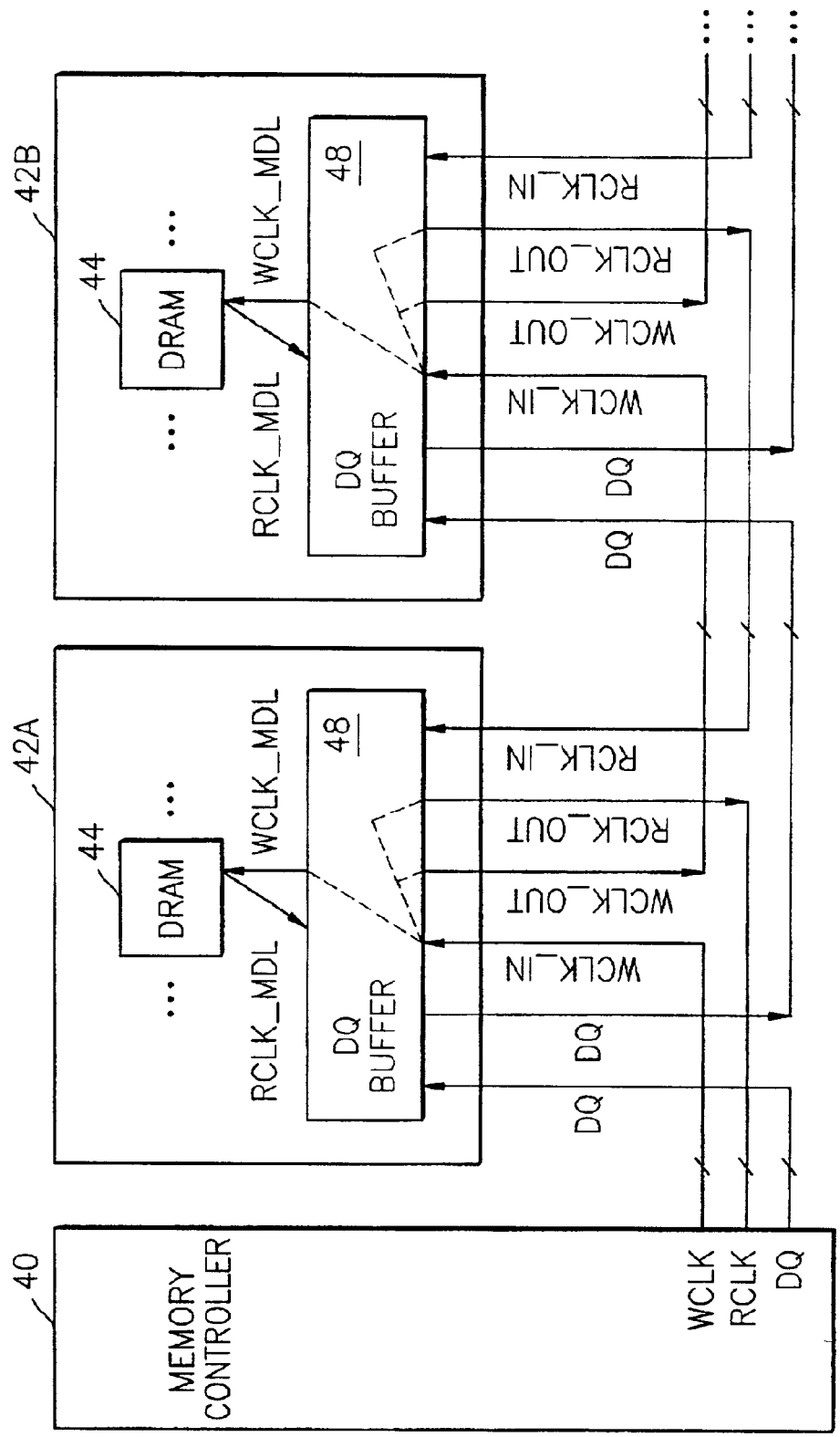
FIG. 5 is a schematic block diagram of a write operation in which the output write clock WCLK_OUT is generated in response to the input write clock WCLK_IN, in accordance with the present invention.

With reference to FIG. 5, during a write operation, data is transferred from the first memory module 42A to the second memory module 42B (and/or from the memory controller 40 to the first memory module 42A) in a left-to-right direction. The data buffer 48 of the first memory module 42A receives write data DQ from the controller 40, in synchronization with the input write clock WCLK_IN signal. The data buffer 48 next determines whether to transmit the write data DQ to the memory devices DRAM 44 on the first memory module 42A, on the basis of the C/A decoding signal generated by the C/A buffer of the first memory module 42A. If the data DQ is to be transferred to the second memory module 42B according to the C/A decoding signal, the data buffer 48 of the first memory module 42A transfers the received data DQ to the data buffer 48 of the second memory module 42B. The first memory module 42A generates an output write clock WCLK_OUT signal based on the input write clock WCLK_IN signal, and the data DQ from the data buffer 48 is transferred from the first memory module 42A to the second memory module 42A in synchronization with the output write clock WCLK_OUT signal generated by the first memory module. The WCLK_OUT signal generated by the first memory module is received as the input write clock WCLK_IN signal at the second memory module 42B for clocking with data transferred from the first memory module 42A to the second memory module 42B.

In this manner, a data buffer 48 of a given memory module 42A, 42B generates at least three clock signals; namely an output write clock WCLK_OUT, an output read clock RCLK_OUT and a module write clock WCLK_MDL based on the input write clock signal WCLK_IN. A PLL or DLL may be employed, for example, to generate the three clock signals in response to the input write clock WCLK_IN signal. Furthermore, the data buffer 48 receives a module read clock signal WCLK_MDL from the memory device 44 in response to the module write clock signal WCLK_MDL, and receives an input read clock RCLK_IN from an adjacent module 42B.

Accordingly, the data buffer 48 in this example includes three clock domains. The first clock domain is determined by the input write clock signal WCLK_IN received from an adjacent lower-order memory module, or memory controller. The second clock domain is determined by the module read clock signal RCLK_MDL received from the local memory devices 44. The third clock domain is determined by the input read clock signal RCLK_IN received from an adjacent higher-order memory module.

By establishing that the data lines for data transfer in synchronization with a given clock are routed with the line for that clock, both on the motherboard connecting the memory modules and the memory controller, and also for the data lines routed on a given module, the present invention provides a suitable clock that is in phase with data for all data being transferred in the system. In other words, the data, and the associated clock, experience the same propagation path, and therefore have the same propagation delay. In view of this, the data and clock are received by the receiving unit in-phase and therefore the received clock can be used to sample the received data with high precision. This feature enhances overall system efficiency and reliability.

In the example provided above, the lines carrying the data DQ signals between the memory controller 40 and the first module 42A, and the data DQ signals between the first module 42A and the second module 42B are preferably routed with the lines of the corresponding WCLK and RCLK signals, as well as the lines of the corresponding control/address and DFLAG and RFLAG signals. Likewise, the lines carrying the data DQ signals between the data buffer 48 and a given memory device 44 are preferably routed with the lines of the corresponding module write clock WCLK_MDL and corresponding module read clock RCLK_MDL signals, to ensure that the data and clock are received by the receiving unit in synchronization with each other.

The difference in phase between the first clock domain that is based on the input write clock signal and the second clock domain that is based on the received module write clock WCLK_MDL signal is the round-trip propagation delay for the module write clock WCLK_MDL and module read clock RCLK_MDL signals from the data buffer 48 to the memory device 44. However, this round-trip delay is fixed by the physical design of the module, that is, by the routing of the WCLK_MDL and RCLK_MDL signals. Therefore the data buffer can readily transfer the data to and from each clock domain through simple clock domain crossing circuitry. Clock domain crossing is used to transfer data received from the memory device 44 in synchronization with the module read clock signal RCLK_MDL at the data buffer 48 for providing read data to be transferred from the module in synchronization with the output read clock RCLK_OUT signal. However, since the delay between the third and first clock domains is fixed, domain crossing is relatively easy, and data can therefore be transferred from the RCLK_MDL clock domain to the RCLK_OUT clock domain. Another need for clock domain crossing in the data buffer 48 arises between the third clock domain based on the input read clock RCLK_IN and the output read clock RCLK_OUT signal of the first clock domain (generated based on the input write clock WCLK_IN signal) for transferring data during a read operation. The phase difference between the input read clock RCLK_IN and the output read clock RCLK_OUT in a given data buffer 48 is the round trip delay from one module to a neighboring module. Since this phase difference is constant or fixed, assuming the respective placements of the modules are such that the modules are at a fixed distance, such compensation is easy to handle. Assuming the phase difference between two clocks differs at the first module and the second module, the buffer should be able to handle this variable phase difference in order to transfer the data between the two clock domains. However, in the present invention, the phase difference between the input read clock RCLK_IN and the output read clock RCLK_OUT is the same at all memory modules. Therefore, the buffer can easily handle the domain crossing. This is in contrast with conventional RAMBUS systems, wherein the phase difference between the forward clock and reverse clock (CTM, CFM) varies, according to the location of the memory device, such that memory devices in these systems require complex domain crossing circuitry.

In the write direction, no domain crossing is needed, since the output write clock WCLK_OUT is generated based on the input write clock WCLK_IN signal, and therefore share the same clock domain, namely, the first clock domain identified above.

Figure 6:
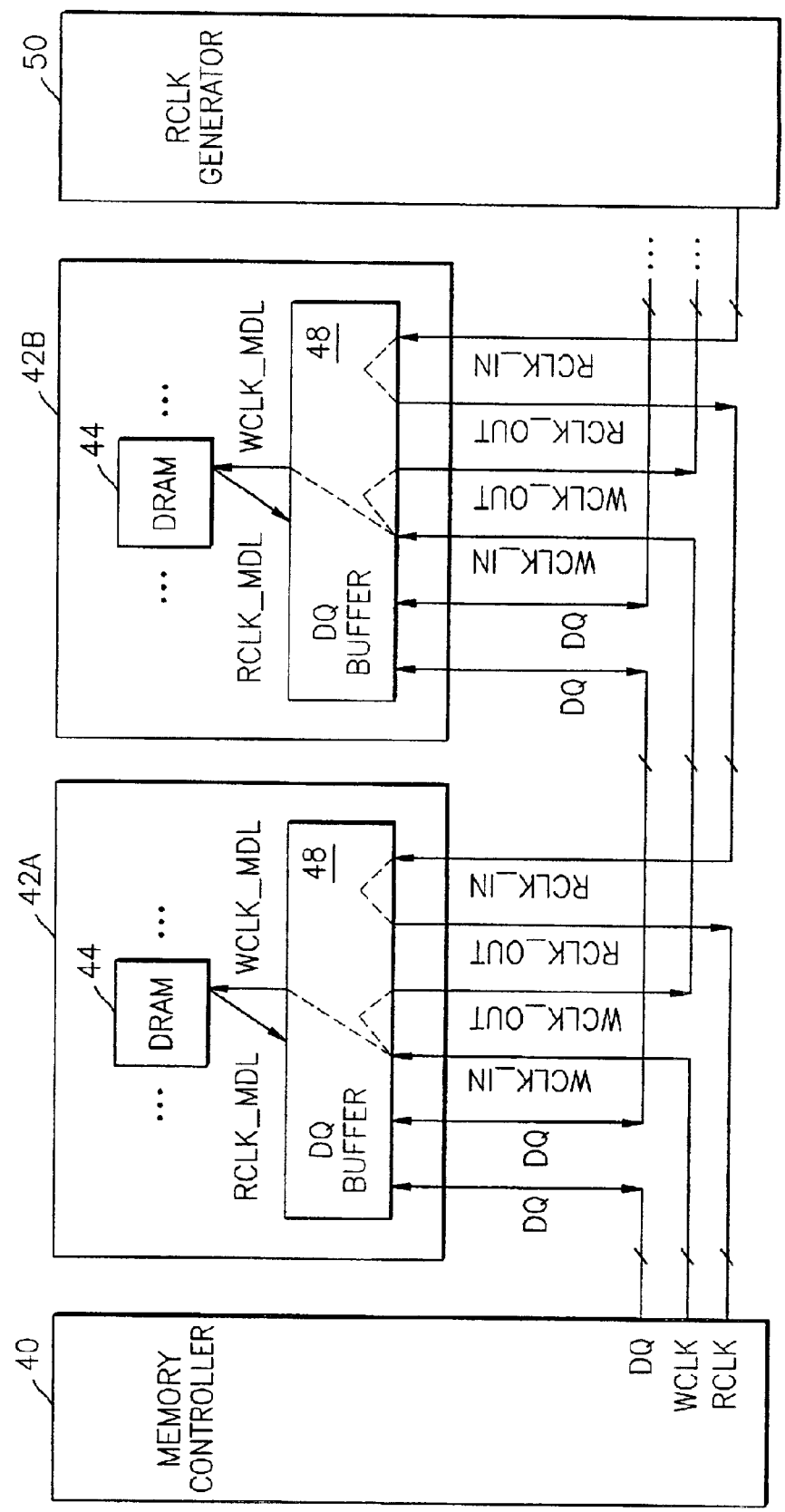
FIG. 6 is a schematic block diagram of a second embodiment of the present invention in which the read clock RCLK is generated by an external read clock generator 50.

FIG. 6 is a schematic block diagram of a second embodiment of the present invention. In this embodiment, the output read clock signal RCLK_OUT is not generated by a given module based on the input write clock WCLK_IN, as described above. Instead, the output read clock signal RCLK_OUT is generated based on the received input read clock signal RCLK_IN. The input read clock signal RCLK_IN is first received by the highest order memory module (in this example, the second memory module 42B), as generated by a master read clock generator 50. The second memory module 42B (as well as the first memory module 42A) generates an output read clock signal RCLK_OUT that is based on the input read clock RCLK_IN signal, as described above.

Figure 7:
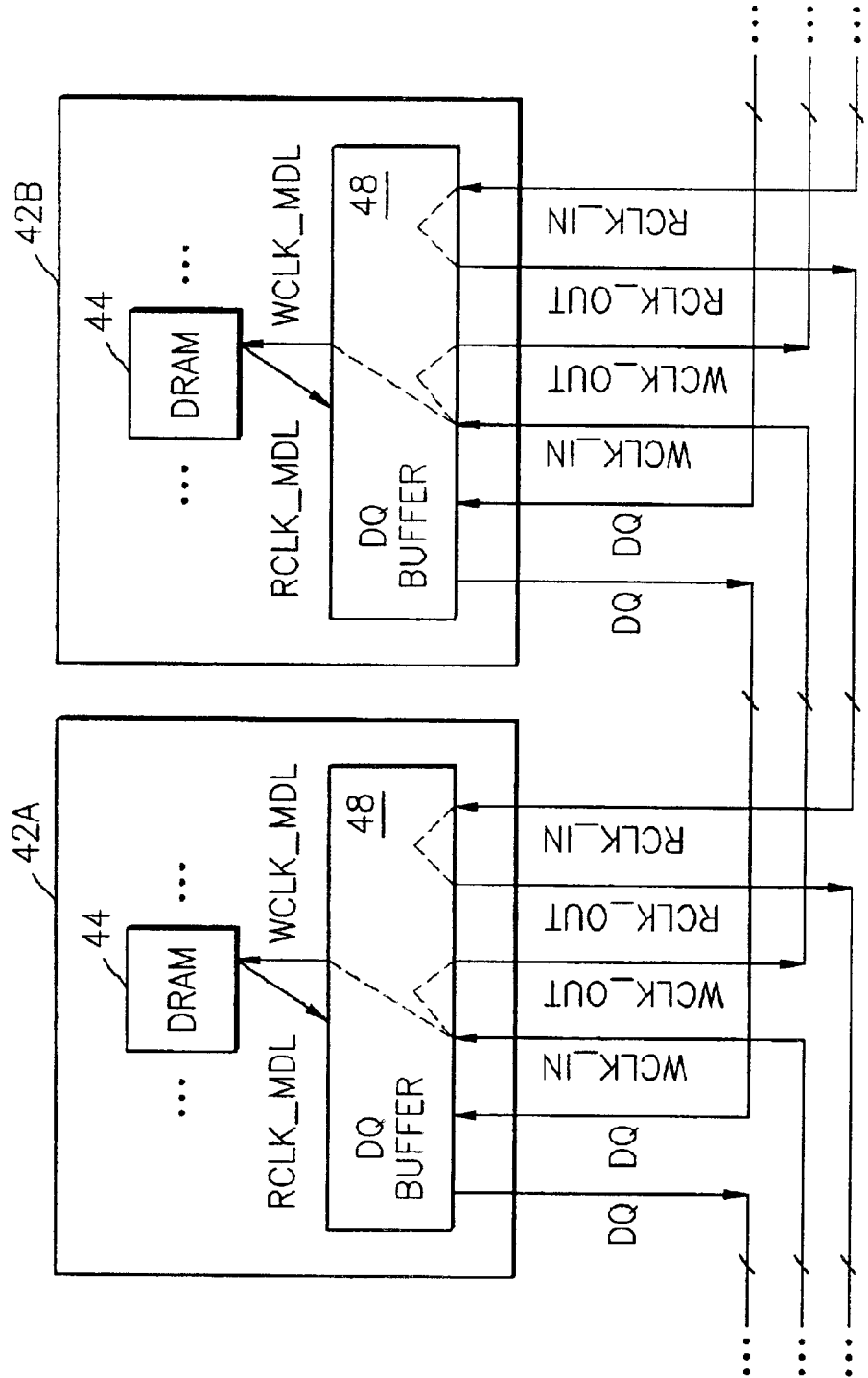
FIG. 7 is a schematic block diagram illustrating generation of the output read clock RCLK_OUT in response to the input read clock RCLK_IN, and generation of the output write clock WCLK_OUT in response to the input write clock WCLK_IN, in accordance with the present invention.

As shown in FIG. 7, during a read operation, data DQ is transferred from the second memory module 42B to the first memory module 42A, and from the first memory module 42A to the memory controller 40, in synchronization with the output read clock signal RCLK_OUT that is generated in response to the corresponding input read clock signal RCLK_IN. The write operation for this embodiment is similar to that of the embodiment described above. Since the input read clock RCLK_IN and output read clock RCLK_OUT share the same phase relationship, no clock domain crossing is required for these two signals. However, the phase relationship between the input write clock WCLK_IN and input read clock RCLK_IN signals varies depending on the position of a given module, since the write clock WCLK and read clock RCLK signals are generated at different sources, and propagate in opposite directions. Therefore, resolution of domain crossing in this configuration is very complicated. This configuration is conceptually similar to that of RAMBUS system. Assume there are 10 memory modules in the system. In this case, the phase difference between the input write clock WCLK_IN signal and the input read clock RCLK_IN signal is different at each memory module. The phase difference at the last module in the chain could be, for example, ten times that of the first module. The resulting phase difference at the last module can be greater than the clock cycle time, or even multiples of the clock cycle time. In this case, the buffer should include phase difference detection circuitry to avoid data transfer failures In the RAMBUS case, a training sequence is employed at the power-up stage to detect the phase difference between the CTM and CFM clocks.

In this manner, the present invention provides clocking technique in a point-to-point memory system by which data, command and address signals are transferred between modules and between a module and memory controller in synchronization with suitable clock signals that experience the same propagation delay as the data signals. In addition, the clocking technique is simplified at each module by generating the output write clock WCLK_OUT, the module write clock WCLK_MDL in response to the input write clock WCLK_IN and the module read clock RCLK_MDL in response to the module write clock WCLK_MDL, and, in a preferred embodiment, the output read clock RCLK_OUT in response to the input write clock WCLK_IN.

While this invention has been particularly shown and described with references to preferred embodiments thereof, it will be understood by those skilled in the art that various changes in form and details may be made herein without departing from the spirit and scope of the invention as defined by the appended claims.

We claim:

1. A memory module for use in a memory system, the memory module comprising:

a first memory module including a memory device, a first buffer, and a second buffer, the first buffer receiving a first write clock signal and a control signal that includes a read or write command in a first direction of transmission, the second buffer receiving the first write clock signal in the first direction of transmission and a first read clock signal in a second direction of transmission, the second buffer being coupled to a first data bus and a second data bus;

the first memory module generating a second write clock signal in response to, and in phase with, the first write clock signal, for transmitting data from the second buffer in the first direction of transmission if the write command indicates that data is to be written to a second memory module in the memory system, the first read clock signal and the second write clock signal being transmitted over independent signal lines, and generating a memory write clock signal in response to, and in phase with, the first write clock signal, for writing data from the second buffer to the memory device if the write command indicates that data is to be written to the memory device in the first memory module; and the first memory module generating a memory read clock signal in response to, and in phase with, a memory write clock signal, for reading data from the memory device to the second buffer if the read command indicates that data is to be read from the memory device in the first memory module, the memory write clock signal having substantially the same propagation delay as data transferred from the second buffer to the memory device and the memory read clock signal having substantially the same propagation delay as data transferred from the memory device to the second buffer.

2. The memory module of claim 1 wherein the first memory module further generates a second read clock signal in response to, and in phase with, the first write clock signal, for transmitting data from the second buffer in the second direction of transmission.

3. The memory module of claim 1 wherein the memory read clock signal is a clock signal returned from the memory device in response to, and in phase with, the memory write clock signal.

4. The memory module of claim 3 wherein the memory read clock signal is generated on a transmission path that is coupled to a transmission path of the memory write clock signal.

5. The memory module of claim 4 further comprising a dummy load coupled to the transmission path of the memory read clock signal and the memory write clock signal.

6. The memory module of claim 4 wherein the transmission path of the memory read clock signal and the transmission path of the memory write clock signal are substantially equal in length to that of a transmission path of the data between the memory device and the second buffer.

7. The memory module of claim 1 wherein the second write clock signal is generated in response to, and in phase with, the first write clock signal, such that the second write clock signal is transferred to the second memory module.

8. The memory module of claim 7 wherein the second write clock signal is generated by a phase locked loop or delay locked loop on the first memory module in response to the first write clock signal.

9. The memory module of claim 1 wherein the second buffer receives a decoding signal generated at the first buffer to determine whether data access is from the memory device on the first memory module or from a memory device on the second memory module 10. The memory module of claim 1 wherein the first buffer receives a first latency signal and transfers the first latency signal to the memory device in response to the first write clock signal.

11. The memory module of claim 10 wherein the first buffer generates a second latency signal in response to the first latency signal.

12. A memory module for use in a memory system, the memory module comprising:
   a first memory module including a memory device and a buffer, the buffer receiving a first write clock signal and a control signal that includes a read or write command in a first direction of transmission, the buffer receiving a first read clock signal in a second direction of transmission, the buffer being coupled to a first data bus and a second data bus;
   the first memory module generating a second write clock signal for timing the transmission of data in the first direction of transmission on the second data bus, the first read clock signal and the second write clock signal being transmitted over independent signal lines; and
   the first memory module generating a memory write clock signal in response to, and in phase with, the first write clock signal, for writing data from the buffer to the memory device if the write command indicates that data is to be written to the memory device in the first module, the memory write clock signal having substantially the same propagation delay as data transferred from the buffer to the memory device.

13. The memory module of claim 12 wherein the first memory module generates a second write clock signal in response to, and in phase with, the first write clock signal, for transmitting data from the buffer in the first direction of transmission if the write command indicates that data is to be written to a second memory module in the memory system.

14. The memory module of claim 13 wherein the second write clock signal is generated by a phase locked loop or delay locked loop on the first memory module in response to the first write clock signal.

15. The memory module of claim 12 wherein the first memory module generates a memory read clock signal in response to, and in phase with, the memory write clock signal, for reading data from the memory device to the buffer if the read command indicates that data is to be read from the memory device in the first memory module.

16. The memory module of claim 15 wherein the memory read clock signal is a clock signal returned from the memory device in response to the memory write clock signal.

17. The memory module of claim 15 further comprising a dummy load coupled to a transmission path of the memory read clock signal and the memory write clock signal.

18. The memory module of claim 15 further comprising a phase locked loop or delay locked loop coupled to a transmission path of the memory read clock signal and the memory write clock signal.

19. The memory module of claim 12 wherein the first memory module generates a second read clock signal in response to, and in phase with, the first write clock signal, for transmitting data from the buffer in the second direction of transmission if the read command indicates that data is to be read from a second memory module in the memory system.

20. The memory module of claim 12 wherein the buffer comprises a first buffer and a second buffer, the second buffer receiving a decoding signal generated at the first buffer to determine whether data access is from the memory device on the first memory module or from a memory device on a second memory module in the memory system.

21. The memory module of claim 20 wherein the first buffer receives a first latency signal and transfers the first latency signal to the memory device in response to the first write clock signal.

22. The memory module of claim 21 wherein the first buffer generates a second latency signal in response to the first latency signal.

23. A memory module for use in a memory system, the memory module comprising:
   a first memory module including a memory device and a buffer, the buffer receiving a first write clock signal and a control signal that includes a read or write command in a first direction of transmission, the buffer receiving a first read clock signal in a second direction of transmission, the buffer being coupled to a first data bus and a second data bus;
   the first memory module generating a second write clock signal for timing the transmission of data in the first direction of transmission on the second data bus, the first read clock signal and the second write clock signal being transmitted over independent signal lines; and
   the first memory module generating a memory read clock signal in response to, and in phase with, a memory write clock signal, for reading data from the memory device to the buffer if the read command indicates that data is to be read from the memory device in the first memory module the memory read clock signal having substantially the same propagation delay as data transferred from the memory device to the buffer; the memory write clock signal being generated in response to, and in phase with, the first write clock signal.

24. The memory module of claim 23 wherein the first memory module generates a second write clock signal in response to, and in phase with, the first write clock signal, for transmitting data from the buffer in the first direction of transmission if the write command indicates that data is to be written to a second memory module in the memory system.

25. The memory module of claim 23 wherein the first memory module generates a memory write clock signal in response to, and in phase with, the first write clock signal, for writing data from the buffer to the memory device if the write command indicates that data is to be written to the memory device in the first memory module.

26. The memory module of claim 23 wherein the first memory module generates a second read clock signal in response to, and in phase with, the first write clock signal, for transmitting data from the buffer in the second direction of transmission if the read command indicates that data is to be read from a second memory module in the memory system.

27. The memory module of claim 23 wherein the buffer comprises a first buffer and a second buffer, the second buffer receiving a decoding signal generated at the first buffer to determine whether data access is from the memory device on the first memory module or from a memory device on a second memory module in the memory system.

28. The memory module of claim 27 wherein the first buffer receives a first latency signal and transfers the first latency signal to the memory device in response to the first write clock signal.

29. The memory module of claim 28 wherein the first buffer generates a second latency signal in response to the first latency signal.

30. A memory module for use in a memory system, the memory module comprising:
a first memory module including a memory device and a buffer, the buffer receiving a first write clock signal and a control signal that includes a read or write command in a first direction of transmission, the buffer receiving a first read clock signal in a second direction of transmission, the buffer being coupled to a first data bus and a second data bus; and
the first memory module generating a second read clock signal in response to, and in phase with, the first write clock signal, for transmitting data from the buffer in the second direction of transmission if the read command indicates that data is to be read from a second memory module in the memory system, wherein the first write clock signal and the second read clock signal are transmitted over independent signal lines.

31. The memory module of claim 30 wherein the first memory module generates a second write clock signal in response to, and in phase with, the first write clock signal, for transmitting data from the buffer in the first direction of transmission if the write command indicates that data is to be written to the second memory module in the memory system.

32. The memory module of claim 30 wherein the first memory module generates a memory write clock signal in response to, and in phase with, the first write clock signal, for writing data from the buffer to the memory device if the write command indicates that data is to be written to the memory device in the first memory module.

33. The memory module of claim 30 wherein the first memory module generates a memory read clock signal in response to, and in phase with, a memory write clock signal for reading data from the memory device to the buffer if the read command indicates that data is to be read from the memory device in the first memory module, the memory write clock signal being generated in response to, and in phase with, the first write clock signal.

34. A memory system comprising:
a memory controller for generating a first write clock signal and a control signal that includes a read or write command; and
a first memory module including a memory device and a buffer, the buffer receiving the first write clock signal and the control signal in a first direction of transmission, the buffer receiving a first read clock signal in a second direction of transmission, the buffer being coupled to a first data bus and a second data bus;
the first memory module generating a second write clock signal in response to, and in phase with, the first write clock signal, for transmitting data from the buffer in the first direction of transmission if the write command indicates that data is to be written to a second memory module in the memory system, the first read clock signal and the second write clock signal being transmitted over independent signal lines, and generating a memory write clock signal in response to, and in phase with, the first write clock signal for writing data from the buffer to the memory device if the write command indicates that data is to be written to the memory device in the first memory module; and
the first memory module generating a memory read clock signal in response to, and in phase with, the memory write clock signal for reading data from the memory device to the buffer if the read command indicates that data is to be read from the memory device in the first memory module, the memory write clock signal having substantially the same propagation delay as data transferred from the buffer to the memory device and the memory read clock signal having substantially the same propagation delay as data transferred from the memory device to the buffer.

35. A memory system comprising:
a memory controller for generating a first write clock signal and a control signal that includes a read or write command;
a read clock generator for generating a first read clock signal; and
a first memory module including a memory device and a buffer, the buffer receiving the first write clock signal and the control signal in a first direction of transmission, the buffer receiving the first read clock signal in a second direction of transmission, the buffer being coupled to a first data bus and a second data bus;
the first memory module generating a second write clock signal in response to, and in phase with, the first write clock signal, for transmitting data from the buffer in the first direction of transmission if the write command indicates that data is to be written to a second memory module in the memory system, the first read clock signal and the second write clock signal being transmitted over independent signal lines, and generating a memory write clock signal in response to, and in phase with, the first write clock signal, for writing data from the buffer to the memory device if the write command indicates that data is to be written to the memory device in the first memory module;

the first memory module generating a memory read clock signal in response to, and in phase with, the memory write clock signal, for reading data from the memory to the buffer if the read command indicates that data is to be read from the memory device in the first memory module, the memory write clock signal having substantially the same propagation delay as data transferred from the buffer to the memory device and the memory read clock signal having substantially the same propagation delay as data transferred from the memory device to the buffer; and the first memory module generating a second read clock signal in response to, and in phase with, the first read clock signal, for transmitting data from the buffer in the second direction of transmission.

36. A method for generating clock signals in a memory system comprising:

receiving, at a first buffer on a first memory module, a first write clock signal and a control signal that includes a read or write command in a first direction of transmission, the first memory module including a memory device;

receiving, at a second buffer on the first memory module, the first write clock signal in the first direction of transmission and a first read clock signal in a second direction of transmission, the second buffer being coupled to a first data bus and a second data bus;

generating a second write clock signal in response to, and in phase with, the first write clock signal, for transmitting data from the second buffer in the first direction of transmission if the write command indicates that data is to be written to a second memory module in the memory system, the first read clock signal and the second write clock signal being transmitted over independent signal lines, and generating a memory write clock signal in response to, and in phase with, the first write clock signal, for writing data from the second buffer to the memory device if the write command indicates that data is to be written to the memory device in the first memory module; and generating a memory read clock signal in response to, and in phase with, a memory write clock signal, for reading data from the memory device to the second buffer if the read command indicates that data is to be read from the memory device in the first memory module, the memory write clock signal having substantially the same propagation delay as data transferred from the second buffer to the memory device and the memory read clock signal having substantially the same propagation delay as data transferred from the memory device to the second buffer.

37. A method for generating a clock signal in a memory system comprising:

receiving, at a buffer on a first memory module, a first write clock signal and a control signal that includes a read or write command in a first direction of transmission, the first memory module including a memory device;

receiving a first read clock signal in a second direction of transmission, the buffer being coupled to a first data bus and a second data bus, and generating a second write clock signal for timing the transmission of data in the first direction of transmission on the second data bus, the first read clock signal and the second write clock signal being transmitted over independent signal lines; and generating a memory write clock signal in response to, and in phase with, the first write clock signal, for writing data from the buffer to the memory device if the write command indicates that data is to be written to the memory device in the first memory module, the memory write clock signal having substantially the same propagation delay as data transferred from the buffer to the memory device.

38. A method for generating a clock signal in a memory system comprising:

receiving, at a buffer on a first memory module, a first write clock signal and a control signal that includes a read or write command in a first direction of transmission, the first memory module including a memory device;

receiving a first read clock signal in a second direction of transmission, the buffer being coupled to a first data bus and a second data bus, and generating a second write clock signal for timing the transmission of data in the first direction of transmission on the second data bus, the first read clock signal and the second write clock signal being transmitted over independent signal lines;

generating, in response to the first write clock signal, a memory write clock signal, the memory write clock signal being in phase with the first write clock signal; and generating a memory read clock signal in response to, and in phase with, the memory write clock signal, for reading data from the memory device to the buffer if the read command indicates that data is to be read from the memory device in the first memory module, the memory read clock signal having substantially the same propagation delay as data transferred from the memory device to the buffer.

39. A method for generating a clock signal in a memory system comprising:

receiving, at a buffer on a first memory module, a first write clock signal and a control signal that includes a read or write command in a first direction of transmission, the first memory module including a memory device;

receiving a first read clock signal in a second direction of transmission, the buffer being coupled to a first data bus and a second data bus; and generating a second read clock signal in response to, and in phase with, the first write clock signal, for transmitting data from the buffer in the second direction of transmission if the read command indicates that data is to be read from a second memory module in the memory system, wherein the first write clock signal and the second read clock signal are transmitted over independent signal lines.

* * * * *